Figure 1:
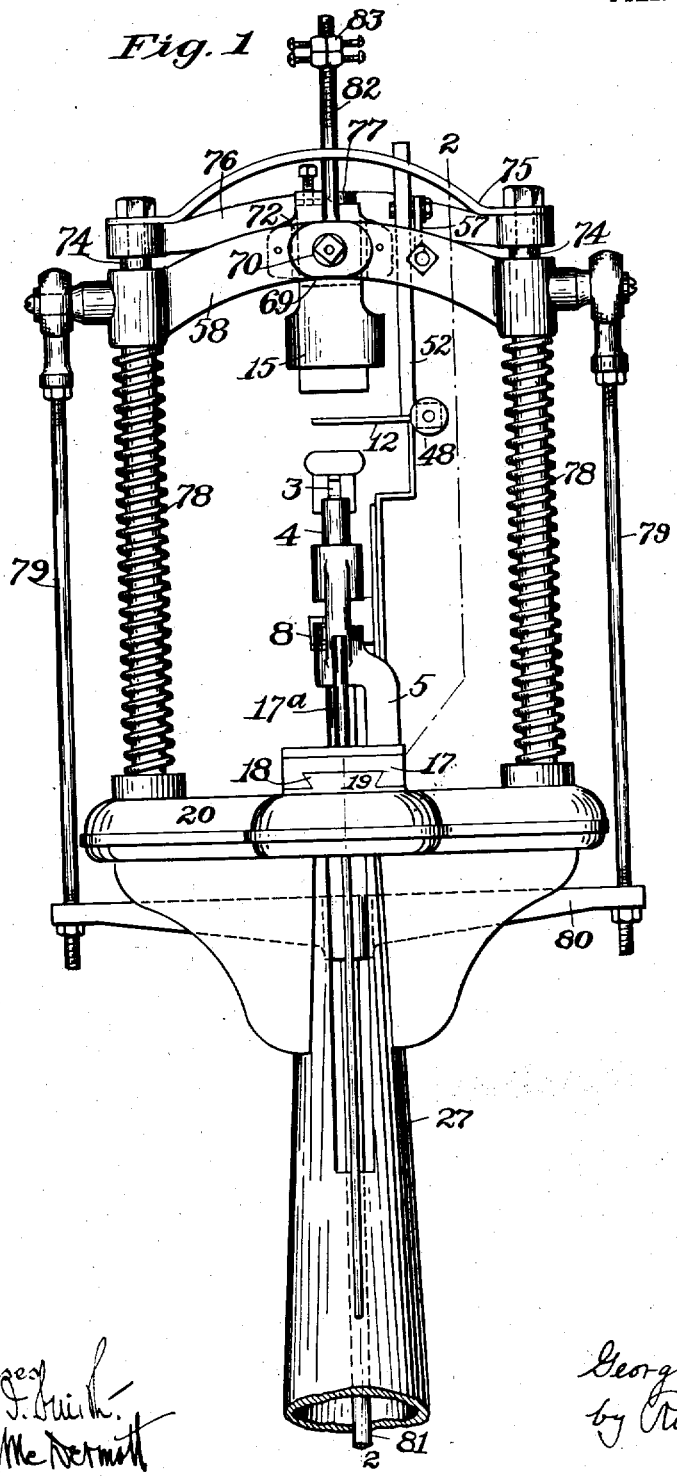

G. T. McLEOD.

HEEL BREASTING MACHINE.

APPLICATION FILED MAY 7, 1912.

Reissued May 20, 1913.

13,565.

4 SHEETS—SHEET 1.

Witnesses
Beatrice J. Quirk.
Charles K. McDermott

Inventor
George T. McLeod,
by Robt. P. Harris.
Attorney

G. T. McLEOD.
HEEL BREASTING MACHINE.
APPLICATION FILED MAY 7, 1912.
Reissued May 20, 1913.
13,565.
4 SHEETS—SHEET 2.
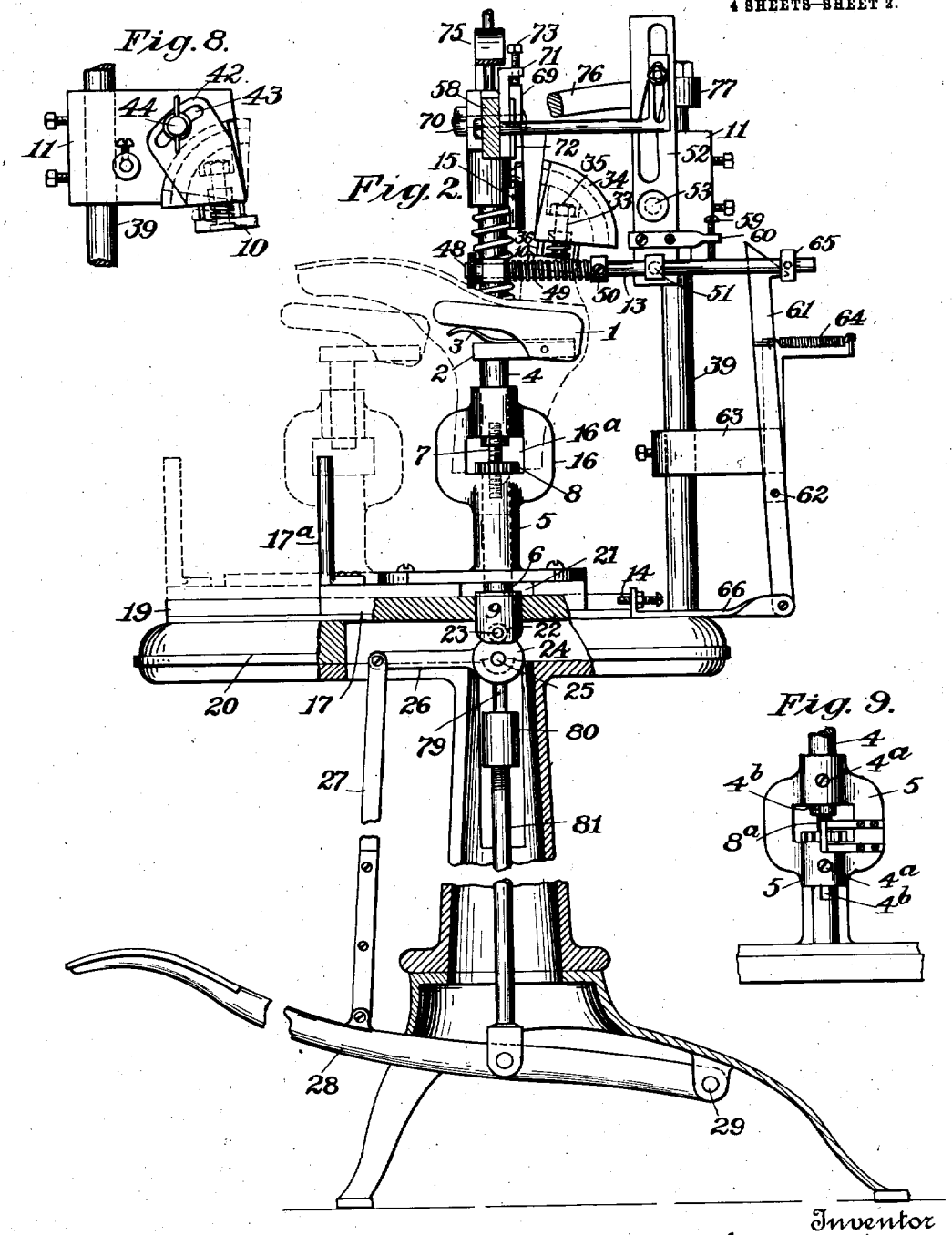
Witnesses
Beatrice J. Smith
Charles K. McDermott
Inventor
George T. McLeod,
by Robt. P. Haines
Attorney G. T. McLEOD.

HEEL BREASTING MACHINE.

APPLICATION FILED MAY 7, 1912.

Reissued May 20, 1913.

13,565.

4 SHEETS—SHEET 3.

Witnesses
Beatrice J. Smith
Charles W. McDermott

Inventor
George T. McLeod,
by Robt. P. Haines
Attorney

G. T. McLEOD.

HEEL BREASTING MACHINE.

APPLICATION FILED MAY 7, 1912.

Reissued May 20, 1913.

13,565.

4 SHEETS—SHEET 4.

Witnesses
Beatrice J. Smith
Charles K. McDermott

Inventor
George T. McLeod,
by Robt. P. Hains.
Attorney

UNITED STATES PATENT OFFICE.

GEORGE T. McLEOD, OF BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

HEEL-BREASTING MACHINE.

13,565. Specification of Reissued Letters Patent. Reissued May 20, 1913.

Original No. 957,986, dated May 17, 1910, Serial No. 196,164. Application for reissue filed May 7, 1912. Serial No. 695,747.

*To all whom it may concern:*

Be it known that I, GEORGE T. McLEOD, a citizen of the United States, residing at Boston, in the county of Suffolk and State of Massachusetts, have invented an Improvement in Heel-Breasting Machines, of which the following description, in connection with the accompanying drawings, is a specification, like characters on the drawings representing like parts.

The aim of this invention is to provide means for so trimming the breast of a shoe heel that the angle between the tread surface of the top lift and the breast of the heel will be in all cases uniform for a given style of shoe or shape of heel.

In the shaping and trimming of the breast of a heel it is difficult to maintain at all times a uniform angle between the tread and the breast thereof, unless some means is provided which will firmly hold the heel in position during the cutting or trimming operation. In consequence of this fact, not only is there lack of uniformity of the shape of the heels of shoes of the same style, but in many cases an extremely clumsy and otherwise unsightly heel is produced, whereby the shoe to which it is attached is rendered unfit for the market.

This invention contemplates the construction of a machine whereby the heel breast may be invariably trimmed at a uniform angle even by an unskilled operator, the construction of the machine being such that after a shoe has been once placed in position upon its support, the shoe and the cutter may be automatically, relatively positioned and firmly held in such relation by the operation of the machine.

The character and scope of the invention will be best understood from a detailed description of one embodiment thereof.

Figure 4:
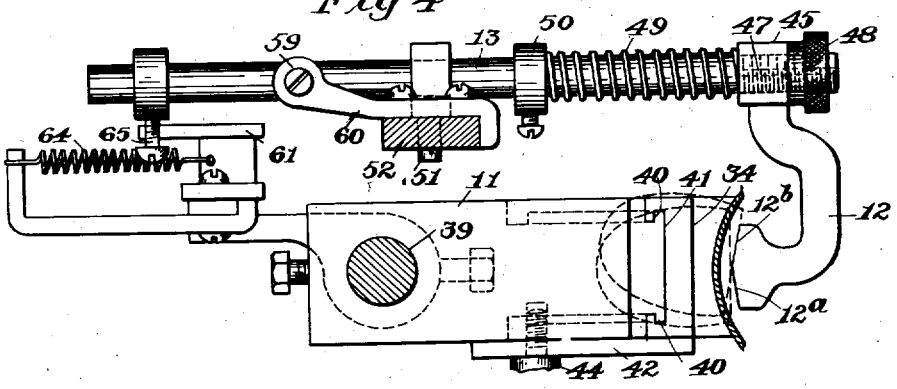
Figure 3:
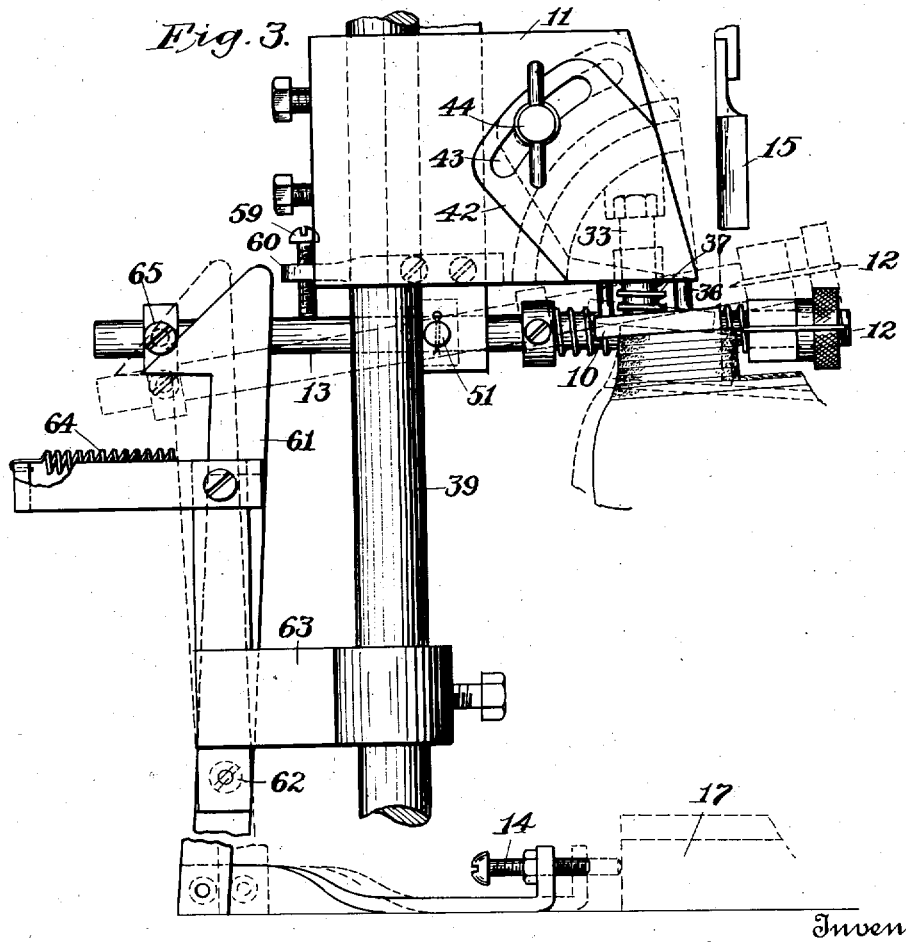
Figure 5:
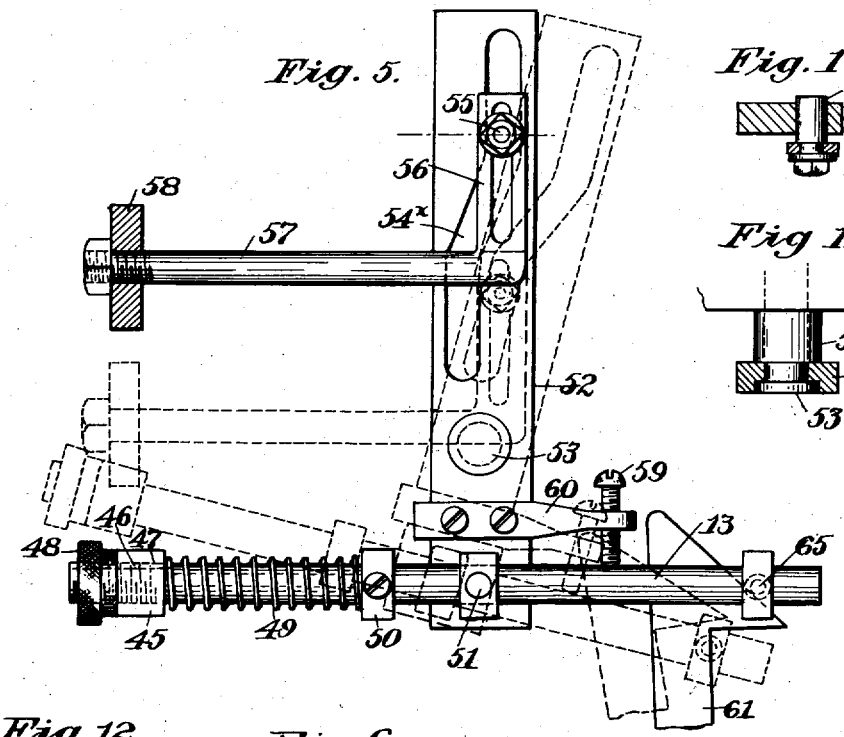
Figure 10:
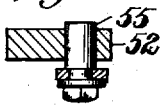
Figure 11:
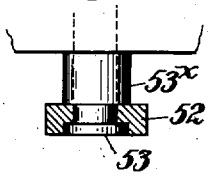
Figure 12:
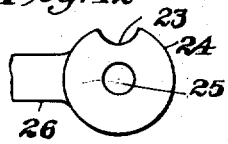
Figure 6:
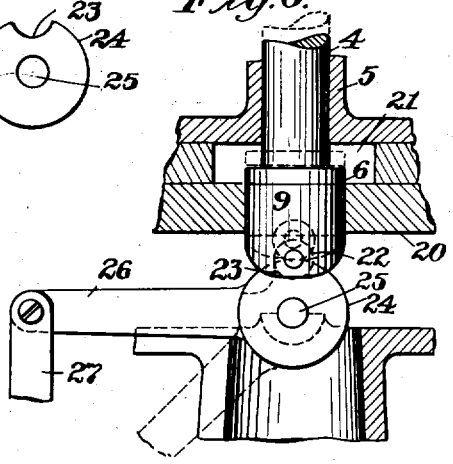
Figure 7:
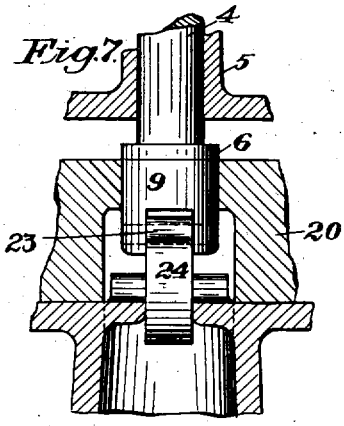

In the drawings: Figure 1 is a front view of the machine; Fig. 2 is a side elevation, partly in section, on the line 2—2, Fig. 1; Fig. 3 is a detached side elevation of the angle block and adjacent parts; Fig. 4 is a plan view of the parts shown in Fig. 3; Fig. 5 is a detached view of the breast gage and operating mechanism therefor; Figs. 6 and 7 are side and rear views, respectively, partly in section, of the jack operated mechanism; Figs. 8 to 12, inclusive, are views of details hereinafter to be described.

The form of mechanism illustrated in Figs. 1, 2, and 3 of the drawings, by which the desired results are accomplished, comprises a suitable jack, 1, pivoted upon a block, 2, and held in normal position by a spring, 3, and supported upon a stem, 4, in a support, 5. This support is capable of a sliding movement in suitable guides from front to rear of the machine; and vice versa. The stem, 4, of the jack, is vertically movable in the support, 5, and is preferably constructed in two sections, an upper section attached to the block, 2, and a lower section terminating in a foot, 6, the two sections being united by adjusting means, as a screw 7, and a knurled nut, 8, located in a suitable enlargement of the support, 5, whereby the height of the jack may be varied proportionately to the height of heels in different styles of shoes.

A suitable stop, $8^a$, preferably spring operated, see Fig. 9, coöperates with the nut 8, to hold the stem, 4, in adjusted position, and the stem is presented from turning in the support 5, by means of screws, $4^a$, which engage slots, at $4^b$, in each section thereof. Vertical movement is imparted to the stem, 4, by means of a cam operated plug, 9, located in the bed plate of the machine upon which the foot, 6, rests when the jack is in rearward or operative position. Above the jack and coöperating therewith for positioning the heel, is an angularly adjustable presser plate, 10, which is mounted in an adjustable head, 11, at the rear of the machine, and positioned to extend over the heel portion of the jack when the latter is in rear operating position and at such a height as to clear the heel of a shoe on the jack when the latter is in its normal, depressed position. A gage device, 12, provided with the beveled faces $12^a$ and $12^b$, constituting gages Figs. 3 and 4, slidably mounted upon a pivoted supporting stem, 13, is normally positioned above the path of the jack, 1, as shown in dotted outline, Fig. 3, and is also provided with means hereinafter described to bring it at the proper time to its operative position shown in full lines, Fig. 3.

The operation of the parts thus far described is as follows: A shoe is placed by the operator upon the jack, 1, when in its forward position, as shown in dotted outline, Fig. 2. The jack is then slid to the rear upon the bed of the machine by means of the hand-piece 17[a], until the base of the support, 5, comes in contact with the adjustable screw, 14, attached to suitable mechanism for tripping the gage device, 12, from its elevated to its operative position. Upon tripping the gage devices 12, the gages take a position in the path of the heel of the shoe upon the jack, whereupon the operator pulls the jack and its support forward until the gage device contacts with the breast of the heel and thus stops the shoe in proper position under the pressure plate, 10. For a right shoe the face or gage 12[a] of the gage device is used and for a left shoe the face or gage 12[b] in order to give the heel breast a slight angle transversely of the shoe as required in some styles, the somewhat loose fit of the shoe upon the jack readily allowing of such adjustment. The jack is now elevated until the tread surface of the heel of the shoe thereon contacts and bears squarely on said presser plate, the jack turning on its pivot to allow the heel to accommodate itself to the position of said plate. During the elevation of the jack, the gage device 12 is caused by suitable mechanism hereinafter described, to move slightly forward to clear the heel and then upward to its elevated position, where it is held until the next operation of the machine. When the heel has been squarely and firmly positioned against the presser plate, 10, a cutter, 15, suitably mounted above and slightly forward of the presser plate, descends and trims off the breast of the heel to the proper shape and at an angle to the tread surface thereof, determined by the position to which the presser plate, 10, has been adjusted. With the presser plate adjusted to a given position, it is obvious that all heels operated upon by the knife will invariably present uniform angles between the breasts and the tread surfaces thereof.

The support, 5, is provided with a base, 17, in the under side of which is a dovetailed groove, 18, which engages a guide, 19, upon the bed, 20, of the machine. The base, 17, also is recessed at 21, immediately below the support, 5, said recess extending a short distance to the front and rear of said support and inclosing the foot, 6, on the jack stem. To operate the jack stem, 4, the vertically movable plug, 9, in the bed plate, 20, is provided with a cam roll, 22, which normally engages a recess, 23, in the cam, 24, the latter being journaled at 25 in the bed of the machine. An operating arm, 26, extends from the cam, 24, and is connected by a link, 27, with the treadle, 28, pivoted at 29 in the frame of the machine. When the cam, 24, is rotated by the operation of the treadle, the cam roll, 22, is raised out of the recess, 23, thereby raising the plug, 9, and the jack stem resting upon it is raised upon the rising of the plug.

The angularly adjustable presser plate, 10, as clearly illustrated in Figs. 3, 4 and 8, is mounted upon a threaded stem, 33, which is held in the sector block, 34, by a nut, 35. Said plate is further held in proper relation to said block by means of guide pins, 36, attached thereto and slidable in suitable recesses in the block. A spring, 37, holds the plate, 10, normally depressed in opposition to the upward pressure of a heel in contact therewith, whereby the plate will yield slightly to allow for slight variations in the heights of heels in the same style of shoe. The supporting block, 34, is adjustably supported in the head, 11, which is itself adjustably mounted upon the standard, 39, rising from the bed plate, 20. Any suitable means may be adopted for adjusting the block, 34, but as here shown, it is constructed in the form of a sector provided with grooves, 40, on its curved face, which engage a rib, 41, on the opposite curved face of the head, 11. In order to hold the block, 34, firmly in its adjusted position, a plate, 42, provided with a slot, 43, may be attached thereto, through which slot projects a set screw, 44, mounted in the head 11.

The breast gages, 12[a] and 12[b], Fig. 4, may be mounted and tripped in any suitable manner, but as here shown they are supported by a gage device 12, which extends from a sleeve, 45, slidably mounted on a pivoted arm, 13, and may be held from rotation on said arm by a tongue, 46, projecting into a groove, 47, in the latter. The gages are adjustably held in position upon the arm, 13, by means of a nut, 48, and a spring, 49, interposed between the sleeve 45, and an abutment, 50, on said arm. Any suitable means may be adopted for operating the gages, but in the construction illustrated herein, the rocker arm, 13, is pivotally mounted at 51, upon a depending rocker arm, 52, which in turn is pivoted at 53 to the head 11, and (see Fig. 11) is spaced from said head by a sleeve 53[x], on the said pivot, 53, in order to bring said arm, 52, into proper position relative to the arm, 13. The upper end of the arm, 52, may be provided with a cam slot, 54[x], in which operates a stud, 55, adjustably mounted upon a slotted arm, 56, which is provided with an extension, 57, mounted upon a vertically reciprocating part, 58, hereinafter described.

Referring to Fig. 5, an adjusting screw, 59, mounted in an arm, 60, attached to the rocker arm, 52, contacts with rocker arm 13, at certain intervals, to hold said arm and the breast gages 12[a] and 12[b], attached thereto in operative position in the path of the heel, and also to assist in moving said arm to its elevated or inoperative position, as herein described.

Referring to Fig. 2, a latch, 61, pivoted at 62, at the rear of the machine, to a convenient part, as an arm, 63, on the standard 39, is normally held by a spring, 64, in the path of a stud, 65, on the arm, 13, to retain the breast gages normally in inoperative position. To operate the latch 61, there is pivoted at its lower extremity an abutment arm 66 provided with the adjustable abutment screw 14, which lies in the path of the movable base 17 of the jack standard 5. When the jack support 5 is moved to the rear and contacts with the abutment screw 14, the latch 61 is tripped, allowing the gages to drop until arrested by a stop 59. The stud, 55, is now caused to descend, thereby rocking the depending arm, 52, throwing the lower end forward and moving the breast gages also slightly forward, clear of the breast of the heel, and upward to the position shown in dotted lines, Fig. 5. At the same time the stud, 65, on the rear end of the arm, 13, engages the beveled upper extremity of the latch, 61, and moves the latter forward to the dotted line position, Fig. 5, whereupon the stud clears the bevel and the latch springs back over said stud, so that when the arm 52 is returned to initial position, the arm, 13, and the breast gages, will be held in their inoperative position, as shown in dotted outline, Fig. 3.

The cutter 15, referred to, is adjustably mounted in any desired manner on the vertically reciprocating crosshead, 58, Fig. 2. As shown in Fig. 2, the knife is secured to a carrier, 69, provided with a vertical slot to receive a bolt, 70, by means of which the cutter may be adjustably secured to the crosshead. A plate, 71, is interposed between the carrier, 69, and the crosshead, 58, and is provided with guide ribs, 72, to hold the cutter carrier in proper vertical position. A set screw, 73, mounted in a suitable extension on the plate, 71, serves to limit the upward adjustment of the cutter and to form an abutment to hold the latter against upward pressure, due to cutting through the leather of the heel.

The crosshead, 58, may be arranged and actuated in any desired manner, but is here shown as slidably mounted upon the standards, 74, which rise from the bed, 20, of the machine and are united at their upper extremity by an arched yoke, 75, and also by the rearwardly extended converging arms, 76, which unite in a hub, 77, engaging the upper extremity of the standard, 39. Springs, 78, surrounding the standards, 74, serve to support the crosshead, 58, in its upper position, and also to return parts of the machine to normal position, after each operation thereof. To actuate the crosshead, depending rods, 79, connect the latter with a yoke, 80, which is actuated by the treadle, 28, through treadle rod, 81. The crosshead, 58, carries a stop rod, 82, which rises through an aperture in the yoke, 75, and is provided above the same with set nuts, 83, which may be adjusted to limit the length of the stroke of the cutter, in order that the latter may completely trim the breast of the heel of the shoe operated upon without cutting into the sole shank.

From the foregoing description it will be obvious that with a machine so constructed, it would be possible for an unskilled operator to perform the usually difficult operations of breasting the heel of shoes with absolute accuracy and uniformity. All that is required of the operator is to move the jack with the shoe upon it into a position determined by the automatically operating breast gages, whereupon, by depressing the treadle, 28, the heel is moved into contact with the presser plate, 10, and thereby automatically and invariably presented in proper relative position to the cutter. The cutter, in its descent, trims the breast of the heel to the required amount and at a predetermined angle to the tread surface, and this stroke of the cutter is automatically limited, so that there can be no possibility of cutting too deeply into the shank of the shoe sole.

While a particular embodiment of the invention has been herein described, it is to be understood that the invention is not limited thereto, but many changes may be made in the construction and relative arrangement of parts in this or other type of machine without departing from the spirit and scope of the invention. It is also to be understood that the particular character of gages herein selected for illustrative purposes are not intended as the only embodiment thereof, because various characters of gages which will determine the lateral swing of the shoe may be employed, and I desire it understood when the term "gage" or "gages" is herein employed that it is intended in the broad sense.

What is claimed is:—

1. In a machine for operating on boots and shoes, the combination of a movable work support; alternatively operative work gages movable toward and from operative position, said work gages being constructed and arranged to determine respectively the desired swing for a right or left shoe; and means to provide for movement of said gages into and out of operative position.

2. In a heel breasting machine the combination of a work support; a movable work gage; a cutter; means controlled by movement of the cutter to move the gage positively to inoperative position; and means independent of the cutter for retaining the gage in said position.

3. In a machine for operating on boots and shoes, the combination, with a work support, and a gage with reference to and against which the boot or shoe is turned about a center adjacent the heel for determining the right or left swing of a boot or shoe sustained by said support, said gage being normally held in inoperative position, of means operable to bring said gage to operative position with respect to the boot or shoe.

4. In a heel breasting machine the combination with a presser plate and a work support, of a gage to determine the relative position of said plate and support and means interposed between said gage and support whereby said gage may be moved to operative position by movement of said support.

5. In a heel treating machine a tool and normally inoperative positioning gages constructed and arranged to determine the right and left angular adjustment of a heel operated upon, relative to said tool, and means permitting the shoe to be swung laterally into contact with one of said gages when it is in operative position, determining the right or left swing to be given the shoe.

6. In a heel breasting machine a cutter, and a gage having oppositely beveled faces to determine the right and left angular adjustment of a heel operated upon, relative to said cutter.

7. In a heel breasting machine the combination with a work support and a tool of a gage, means for holding said gage normally in inoperative position and means under the control of said support, to trip the gage to operative position.

8. In a heel breasting machine, the combination of a presser plate; a work support movable transversely thereof; a work gage for limiting movement of said support in one direction; and means to provide for placing the gage in operative position when the support is moved in the opposite direction.

9. In a heel treating machine the combination of a tool; a work gage movable to and from operative position; means to hold the gage in inoperative position; and a work support arranged to act on said means to release the gage and permit it to move to operative position.

10. In a heel breasting machine, the combination of a cutter; a work support movable transversely of the cutter; a movable gage to determine the position of the work; and means to provide for movement of the gage into and out of operative position.

11. In a heel breasting machine, the combination of a movable cutter, means for actuating said cutter, a movable heel support, a breast gage, and means interposed between said gage and cutter and between said gage and support, respectively, whereby said gage may be moved into and out of operative position by movement of said support and said cutter actuating means, respectively.

12. In a heel breasting machine, a cutter, a movable work support, a breast gage for positioning said support relatively to said cutter, a latch for holding said gage in inoperative position, and means whereby said latch may be tripped by said support.

13. In a heel breasting machine the combination with a reciprocating cutter and a work support movable transversely thereof, of a gage to limit the transverse movement of said support, and means positively actuated simultaneously with the cutting stroke of the cutter to move said gage to inoperative position.

14. In a heel breasting machine a pivoted jack, a cutter, and means toward and from which said jack is movable for determining the inclined position of said jack relatively to said cutter and a gage to determine the initial position of said jack prior to movement toward said means.

15. In a heel breasting machine, the combination of a cutter; a gage for determining the angles at breast-corners of the heels; and means for determining angles between heel breasts and treads.

16. In a heel breasting machine, the combination of a cutter; gages arranged for positioning heel breasts in different transverse angular relations to the cutter; and adjustable means for determining angles between heel breasts and treads.

17. In a heel breasting machine, the combination of a cutter; gages arranged for positioning the breasts of a pair of heels successively in reciprocal angular relations to the cutter; and means for determining uniform angles between said breasts and the heel treads.

18. In a heel breasting machine, the combination of a cutter; gages arranged for positioning the breasts of a pair of heels successively in reciprocal transverse angular relations to the cutter; and adjustable means for determining the angles between the heel breasts and treads.

19. In a heel breasting machine the combination of a cutter; relatively movable members including a work support having opposed pressure-sustaining surfaces to hold a heel between them; a breast gage for positioning the heel relatively to the cutter; latching means, for holding the gage in inoperative position, arranged to be tripped by movement of said work support.

20. In a machine for operating upon the bottoms of boots and shoes, the combination of a work support or jack for sustaining a lasted shoe; a tool; and alternatively-operative work-contacting gaging surfaces constructed and arranged to determine right and left relative swings of shoes and the tool, said gaging surfaces being movable into and out of gaging position, said work support or jack permitting the shoe to be swung into gaging contact with one or the other of said gaging surfaces when in gaging position.

21. In a machine for operating upon the bottoms of boots and shoes, the combination of a work support or jack; a tool; and normally inoperative work-contacting gaging surfaces constructed and arranged to determine right and left relative angular adjustments of shoes and the tool, said gaging surfaces being movable into operative position and said jack permitting the shoe to be swung to the right or left into contact with one or the other of said gaging surfaces when in gaging position.

22. In a machine for operating upon the bottoms of boots and shoes, the combination of a tool; a work support; gages, movable from inoperative to operative positions, and constructed and arranged to determine respectively right or left relative angular adjustments of a shoe and the tool; and provision for relatively moving said gages and work support for introducing one of said gages into position to be met by the shoe as the latter is swung laterally about a center adjacent the heel.

23. In a machine for operating upon the bottoms of boots and shoes, the combination of a tool; gaging means to determine a right or left relative angular adjustment of a shoe and the tool; and means to move the gaging means away from the shoe to an inoperative position.

24. In a machine for operating upon boots and shoes, the combination of a tool; alternatively operative gaging devices constructed and arranged to determine a right or left angular adjustment of a shoe and the tool; and treadle-controlled means for moving said gaging devices into operative position.

25. In a machine for operating on heels, the combination of a tool; an adjustable pressure surface against which a heel is held to predetermine an inclined relation in which the tool shall act upon the heel; work-carrying means angularly adjustable to suit the inclination determined by adjustment of the pressure surface; gaging means whereby to locate the heel with relation to the tool and means to move the gaging means into and out of operative position during the operation of the machine.

26. In a machine for operating on heels, the combination of a tool; an adjustable pressure surface against which a heel is held to predetermine an inclined relation in which the tool shall act upon the heel; work-carrying means angularly adjustable to suit the inclination determined by adjustment of the pressure surface; gaging means by which the operator may locate the heel by moving the latter endwise into its proper relation to the tool and means for moving the gaging means into and out of gaging position.

27. In a heel breasting machine, the combination of a breasting tool and a jack, relatively movable from inoperative to operative relation; gaging means whereby the operator may determine the operative relation of the shoe and tool; operating devices for moving the gaging means into and out of gaging position and adjustable positioning means to coöperate with the jack for determining an inclined relation between a shoe and the breasting tool, said means and the jack being relatively movable.

28. In a machine for operating on the bottoms of boots and shoes, the combination of a tool; alternatively-operative work-contacting gaging surfaces constructed and arranged for determining right and left relative angular adjustments of the work and the tool; and means to determine an inclined relation in which the tool shall act upon the work.

29. In a heel breasting machine, the combination of a cutter; alternatively-operative gaging means constructed and arranged respectively for permitting the acting cutter to shape breasts of successive heels in reciprocal angular relations to the longitudinal medians of the respective heels; and means for determining uniform angles between said breasts and heel treads.

30. In a heel breasting machine, the combination of a cutter; alternatively-operative gaging means constructed and arranged respectively for permitting the acting cutter to shape breasts of a pair of heels successively in reciprocal angular relations to the longitudinal medians of the respective heels; and adjustable means for determining the angles between the heel breasts and treads.

31. In a heel breasting machine, the combination of a cutter; alternatively-operative means constructed and arranged for determining angles between the finished breasts and longitudinal medians of heels; and means for determining angles between heel breasts and treads.

32. In a heel breasting machine, the combination of a cutter; work-contacting means constructed and arranged for determining angles between the finished breasts and longitudinal medians of heels; and means for determining angles between heel breasts and treads.

33. In a machine for operating upon the bottoms of boots and shoes, the combination of a tool; alternatively-operative gaging means having provisions for positioning heel breasts in reciprocal angular relations to the tool; and adjustable means for determining the horizontal inclination of the work.

34. In a machine for operating on the bottoms of boots and shoes, the combination of a tool; means for determining right and left relative angular adjustments of the work and the tool; and variable means to determine an inclined relation in which the tool shall act upon the work.

35. In a machine for operating upon the bottoms of boots and shoes, the combination of a tool; a work gage whereby the work is positioned with relation to the tool; work clamping means adjustable to vary the inclined relation of the tool and work; and means operative while the work is clamped to remove the gage from operative position.

36. In a machine for operating on the heels of boots and shoes, the combination of a tool, means for causing it to act in a direction toward and from the heel to be treated, alternatively operating devices to determine right or left angular relation of the shoe with respect to the plane of action of the tool, and means for moving said devices into and out of operative position with respect to the shoe.

37. In a machine for operating upon the heels of boots and shoes, the combination of heel treating means; and means for presenting a shoe thereto, including a work support and gaging devices normally out of engagement therewith, said parts being constructed and arranged to permit said shoe to be swung to bring the shoe into contact with said gaging devices to determine the right or left alinement of the shoe with relation to the heel treating means.

38. In a machine for operating on boots and shoes, the combination of a work support, a normally inoperative gage, and means to cause said gage to be brought to an operative position out of engagement with said work support, said parts being constructed and arranged to permit said work support to be moved to bring the shoe thereon into contact with said gage when in said operative position.

39. In a machine for operating upon the bottoms of boots and shoes, the combination of a tool; a movable work support; and gaging means constructed and arranged to be introduced to operative position as the support is moved in one direction, and provisions whereby the work may be moved in the opposite direction to position it by means of said gage.

40. In a machine for operating on boots and shoes, the combination with a work support and a gage toward and against which the shoe is swung for positioning the work on said support, said gage being movable toward and from operative position, of means operable to bring said gage to operative position to determine the extent of lateral swing to be given the shoe.

41. In a machine for operating on boots and shoes, the combination, with a tool and means for reciprocating said tool toward and from the work, of means for determining the lateral swing of a shoe relative to said tool comprising alternatively operative position determining devices, and mechanism for moving said devices into and out of operative position.

42. In a machine for operating on boots and shoes, the combination, with a tool and means for causing operative movement of said tool toward and from the work, of a plurality of position determining devices each of which is alone adapted to determine the lateral swing of a shoe relative to said tool, and devices for causing movement of said devices into and out of operative position.

43. In a machine for operating on boots and shoes, the combination of a normally inoperative work gage, a work support movable from a work receiving to a preliminary position, and means for bringing said gage to operative position when said work support is in said preliminary position, said work support being thereafter movable to a final position determined by said gage.

44. In a heel breasting machine, the combination, with breasting means and a work support, of alternatively operative devices constructed and arranged to engage the breast of the heel of a shoe on said support to position said heel relatively to said breasting means.

45. In a machine for operating upon the bottoms of boots and shoes, the combination of a tool, gaging means to determine respectively right and left relative angular adjustments of shoes and the tool, and means to move the gaging means upwardly away from the shoe to permit free manipulation of the shoe.

46. In a machine for working on the bottoms of boots or shoes, the combination of operating means, means for supporting a boot or shoe in a stationary position during operation of the operating means thereon, and gages adapted to be alternatively engaged by the work to determine the right or left angular adjustment thereof relative to the operating means.

47. A heel breasting machine having, in combination, a knife, a shoe support mounted for movement into and out of position under the knife, manually operable means for raising the shoe toward the knife, yieldingly supported heel engaging means arranged for contact with the shoe during the raising of the shoe and prior to its contact with the knife and stationary stop means for limiting relative movement of the shoe and knife to prevent cutting of the shank.

48. In a heel breasting machine, the combination of a breasting knife, a work support movable into and out of a position beneath said knife, a presser plate, a spring back of said plate, a manually operable device for elevating said work support to clamp the heel of a shoe between the work support and the presser plate, and a stationary stop device, mounted upon the machine frame, for limiting relative movement of the knife and shoe to prevent injury to the shank of the sole.

In testimony whereof, I have signed my name to this specification, in the presence of two subscribing witnesses.

GEORGE T. McLEOD.

Witnesses:

G. L. REAGLE,

BEATRICE I. SMITH.